United States Patent [19]
Gallo

[11] Patent Number: 5,858,435
[45] Date of Patent: Jan. 12, 1999

[54] METHOD OF CLEANING AND PREPARING A QUANTITY OF PRODUCE FOR SALE

[76] Inventor: John B. Gallo, 5005 Tamoka Ct., Ft. Pierce, Fla. 34951

[21] Appl. No.: 831,787

[22] Filed: Apr. 9, 1997

Related U.S. Application Data

[60] Provisional application No. 60/014,761 Apr. 10, 1996.
[51] Int. Cl.[6] .................................. A23B 7/00; A23L 3/00
[52] U.S. Cl. .......................... 426/320; 426/302; 426/331; 426/335; 426/506; 426/532; 422/28; 422/32
[58] Field of Search ..................................... 426/302, 310, 426/320, 331, 333, 335, 506, 532; 422/28, 32

[56] References Cited

U.S. PATENT DOCUMENTS

| | | | |
|---|---|---|---|
| 2,228,410 | 1/1941 | Sharma et al. | 426/335 |
| 2,374,209 | 4/1945 | Kalmar | 426/335 X |
| 2,417,932 | 3/1947 | Kalmar | 426/335 X |
| 4,992,216 | 2/1991 | Saita et al. | 261/122 |
| 5,405,631 | 4/1995 | Rosenthal | 426/506 X |

*Primary Examiner*—Milton Cano
*Attorney, Agent, or Firm*—Malloy & Malloy, P.A.

[57] ABSTRACT

A method of cleaning and preparing a quantity of produce for sale that includes the steps of placing the produce on a conveyor and rotating it so as to expose all sides thereof, spraying the produce with a mixture of water and ozone so as to cover the produce and so as to loosen dirt and mold, and kill bacteria, placing the produce on a rotating brush bed so as to brush the produce and remove the loosened dirt and mold, spraying the produce with a further mixture of water and ozone so as to clean, rinse and disinfect the produce, removing excess water from the produce, applying food grade wax to the produce, and drying the produce.

20 Claims, 2 Drawing Sheets

5,858,435

METHOD OF CLEANING AND PREPARING A QUANTITY OF PRODUCE FOR SALE

This application claims the benefit of U.S. Provisional Application No. 60/014,761, filed on Apr. 4, 1996.

BACKGROUND OF THE INVENTION

1. Field of the Invention

The present invention relates to a method of cleaning and preparing a quantity of produce, such as fruits and/or vegetables, the method providing a safe and sanitary cleansing process which does not excessively raise the pulp temperature of the produce and does not require the use of detergents and/or chlorine as a cleaning agent.

2. Description of the Related Art

Fresh produce, such as fruits and vegetables, will generally undergo a certain degree of processing or preparation before it is presented for sale. The primary reasons for this processing relates to the dirt and/or pesticides which may be on the produce when picked, and to a general desire to place the produce in its most presentable, appealing condition for an extended period of time during sale.

In order to provide the necessary processing, most produce processing facilities generally pass the produce through an elaborate washing and sanitizing system. Generally, however, conventionally utilized washing processes involve the use of a cleansing agent to remove dirt and/or chemicals from the surface of the food. Typically, the cleaning agents utilized include soaps or detergents, or a concentrated quantity of chlorine which is sprayed onto the food. Subsequently, the produce is rinsed and dried such that a food grade wax may be applied to the cleaned produce. In particular, the food grade wax provides a more attractive exterior appearance to the produce, and provides a certain degree of preservation and added shelf life to the produce. The food grade wax, however, which must necessarily be added in a liquefied form, must also be dried onto the produce before the produce is ready to be shipped. Along these lines, in addition to the concerns associated with utilizing detergents or chlorine in the cleansing of the produce, both due to the nature of those chemicals and the normal, limited cleansing abilities thereof, a further concern associated with conventional preparation processes relates to the drying of the produce. In particular, conventional produce washing and drying processes dry the produce utilizing heat obtained from direct gas fired heaters or steam from a boiler. Moreover, temperatures of between 115 to 125 degrees are achieved. Naturally, these high temperate, while drying the produce will also substantially raise the pulp temperature of the produce resulting in damage or other premature degradation of the produce.

Accordingly, it would be beneficial to provide a method of cleaning and preparing produce which is efficient to utilize, does not use potentially harmful detergents or chlorine, and does not excessively raise the pulp temperature of the produce in order to effectuate drying thereof.

SUMMARY OF THE INVENTION

The present invention is directed towards a method of cleaning and preparing a quantity of produce for sale. In particular, the method includes an initial step of placing the quantity of produce to be prepared on a conveyor which rotates the produce so as to expose all sides thereof. Subsequently, the quantity of produce is sprayed with a quantity of water and a quantity of ozone so as to cover the produce and so as to loosen dirt and mold, and kill bacteria from the quantity of produce.

Next the produce is places on a rotating brush bed. The rotating brush bed brushes the produce, thereby removing the loosened dirt and mold from the produce. At that point, the produce is once again sprayed with a further quantity of water and with a further quantity of ozone. This second spraying with water and with ozone functions to clean, rinse and disinfect the produce. At that point, excess water is removed from the produce such that a food grade wax may be applied thereto.

Once the food grade wax is applied to the produce, the produce is placed on a first drying conveyor and is dried. Next, the produce is rotated onto a second drying conveyor and is once again dried, thereby ensuring that all sides of the produce have been effectively dried and prepared for sale.

It is an object of the present invention to provide a method of cleaning and preparing a quantity of produce which does not require the use of harmful detergents, or chemicals, yet which effectively cleans and disinfects the food prior to its dispensing for sale.

Yet another object of the present invention is to provide a method of cleaning and preparing a quantity of produce which can be effectively automated and utilized to prepare substantial quantities of produce.

Still another object of the present invention is to provide a method of cleaning and preparing a quantity of produce which does not substantially raise the pulp temperature of the produce, yet which provides for effective and necessary drying of the produce.

Also another object of the present invention is to provide a method of cleaning and preparing a quantity of produce which effectively and completely prepares the produce, effecting all surfaces of the produce, even when prepared in a bulk processing.

These and other objects will become readily apparent upon reviewing the following detailed description and the accompanying claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE DRAWINGS

Figure 1:
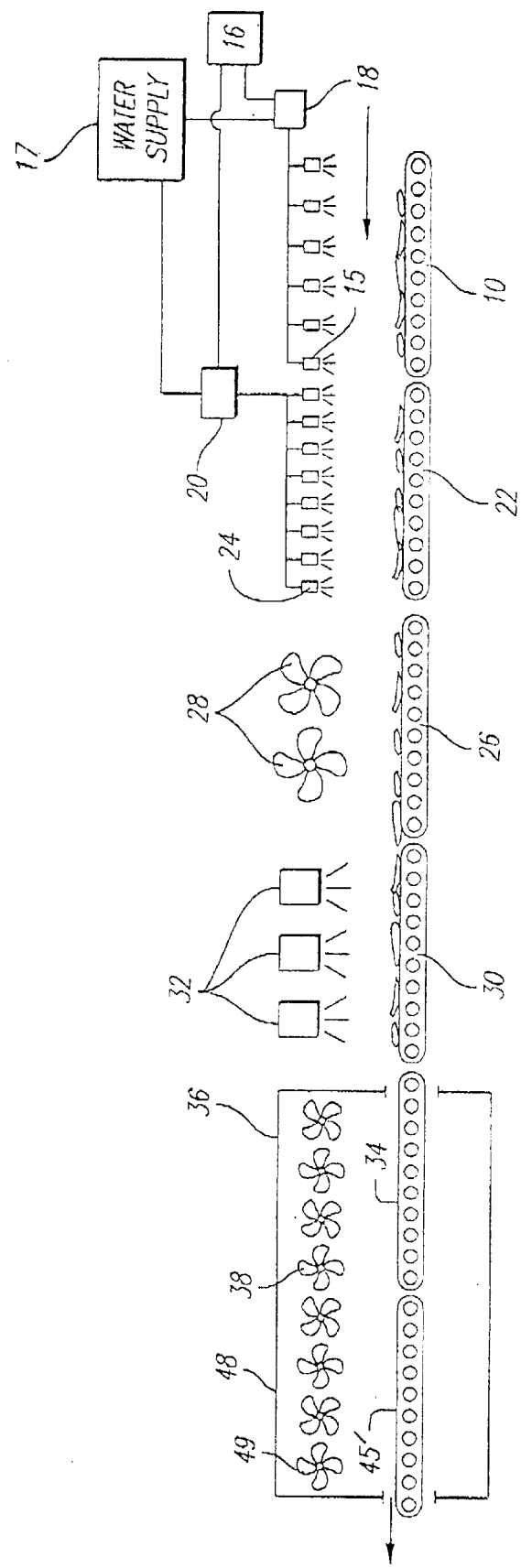
FIG. 1 is a schematic illustration of the method of cleaning and preparing a quantity of produce of the present invention.

Shown throughout the Figures, the present invention is directed towards a method of cleaning and preparing a quantity of produce. Specifically, the method is primarily utilized with produce such as fruits and vegetables in order to effectively clean, dry and prepare the produce for sale. The accompanying figures illustrate the preferred automated systems to be utilized to apply the method of the present invention.

An initial step of the present invention preferably involves placing the quantity of produce on a roller conveyor 10. The roller conveyor 10 is structured to constantly turn and rotate the produce, thereby exposing all sides of the produce. Moreover, if desired, the conveyor 10 may include a brush conveyor which in addition to rotating the produce will also brush it.

In the preferred embodiment wherein the produce is rotated by the conveyor 10 in order to expose all sides thereof, the produce is, preferably simultaneously, sprayed with a quantity of water and with a quantity of ozone. In particular, the quantity of water and quantity of ozone are preferably sprayed in a single mixture onto the produce, thereby loosening dirt and mold and killing bacteria on the produce. In this embodiment, the water and ozone are sprayed simultaneously through a plurality of spray heads 15. In the preferred embodiment, six spray heads 15 are disposed over the conveyor 10, each spraying the produce at a rate of about 0.5 gallons per minute, per spray head. As illustrated in the Figures, in the preferred embodiment, an ozone generator 16 is provided to inject ozone into water from a water supply 17, such as within a mixing chamber 18. From there, the water and ozone mixture is directed into the various spray heads 15 for appropriate spraying of the produce on the conveyor 10.

Next, the quantity of produce is brushed. This step is preferably preformed by placing the produce on a rotating brush bed 22. For example, in a preferred embodiment a brush bed that is 52 inches wide and 18 feet long, and which includes a total of about 22 brushes, is utilized, thereby removing the dirt and mold that was previously loosened by the spray of ozone and water from the spray heads 15. Preferably simultaneous with the brushing of produce, the quantity of produce is sprayed with a further quantity of water and with a further quantity of ozone. This additional spraying with a further quantity of water and further quantity of ozone functions to clean, rinse and disinfect the produce as it is being brushed on the brush bed 22. Although the ozone and the water may be separately sprayed onto the produce, it is preferred that a mixture of ozone and water also be utilized above the brush bed 22. In the preferred embodiment, the produce is sprayed at a rate of about one gallon per minute per spray head of ozone and one gallon per minute per spray head of water. Moreover, preferably eight spray heads 24 are provided and are supplied from a mixing chamber 20 in order to effectively spray the produce. Furthermore, the rotating brush bed 22, in addition to brushing the produce, will also generally function to rotate the produce and ensure that all sides of the produce will be exposed to the further quantities of ozone and water sprayed through spray heads 24.

As a further step, excess water is removed from the quantity of produce. Preferably, the excess water is removed by moving the produce onto another brush bed 26 disposed beneath a plurality of fans 28. In particular, the fans 28 blow air over the quantity of produce at ambient temperature, thereby removing a substantial quantity of the excess fluid from the produce itself without raising a temperature of the produce. At that point, the produce is passed to another conveyor, also preferably a brush bed 30 over which a plurality of dispensers apply food grade wax to the produce. Specifically, the food grade wax is applied, either via dripping or spraying through a plurality of applicators 32 positioned in close proximity to the brush bed 30. Accordingly, as the brush bed 30 functions to rotate the produce, generally all sides of the produce will be effectively coated with the wax.

Figure 2:
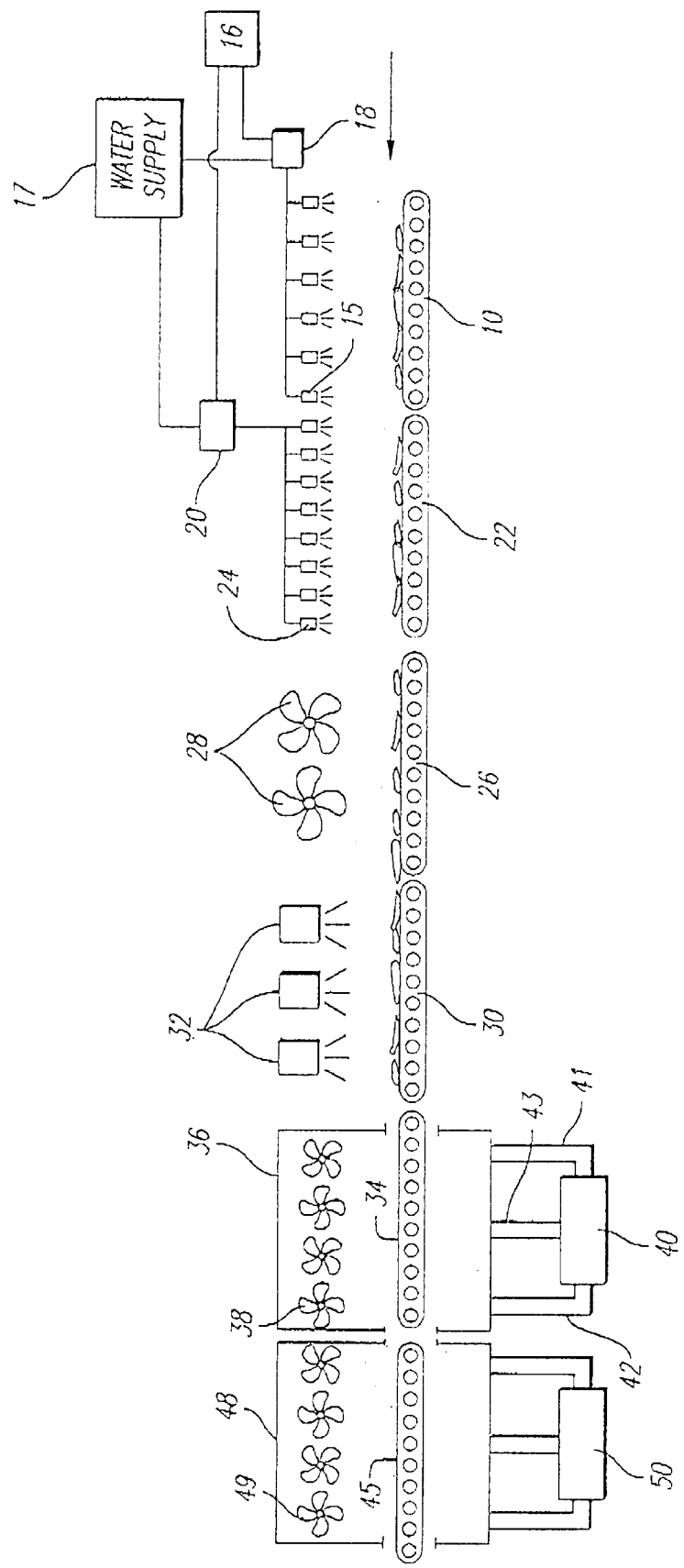
FIG. 2 is a schematic view of an alternative embodiment of the method of cleaning and preparing a quantity of produce of the present invention.

As the wax is generally wet in order to provide for its effective application to the quantity of produce, it is necessary to take a next step of drying the quantity of produce. In the preferred embodiment, the step of drying the quantity of produce includes an initial step of placing the produce on a first drying conveyor 34. This first drying conveyor 34 is preferably disposed in a first, enclosed drying room 36. The drying room 36 contains at least one fan 38 and a dehumidifier 40 which function to dry the produce without excessively raising its pulp temperature. In the preferred embodiment, the dehumidifier in the first, enclosed drying room 36 includes an 1100 CFM desiccant dehumidifier 40 operating at about 17 to 24 degrees relative humidity. The desiccant dehumidifier 40 is generally connected with an air out take 42 which draws air from the enclosed drying room 36, and an in take 41 which introduces the de-humidified air back into the enclosed drying room 36. Moreover, an exhaust duct 43 is also provided with the desiccant dehumidifier 40. As a result, the produce can be effectively dried. Generally, however, only a single side of the produce will be dried in the first enclosed drying room 36. As a result, in the preferred embodiment, an additional step of transferring the quantity of produce onto a second drying conveyor 45 is achieved. In a first preferred embodiment of FIG. 1, the second drying conveyor 45' is also located within the first enclosed drying room 36. As a result, the fans 38 and desiccant dehumidifier 40 of the first enclosed drying room 36 also function to dry the produce on the second drying conveyor 45'. Indeed, as is illustrated in the Figures, in the preferred embodiment the produce is dropped onto the second drying conveyor 45' so as to provide for effective rotation and exposure of an opposite side of the produce before the process is to be completed. Turning to FIG. 2, however, the second drying conveyor 45 may also be incorporated within a second enclosed drying room 48. Similarly, the second enclosed drying room 48 includes a plurality of fans 49 and a desiccant dehumidifier 50 connected thereto to provide for effective drying of the produce. In the preferred embodiment, the first drying conveyor 34 is 72 inches wide and 20 feet long, with the second drying conveyor 45 being 72 inches wide and 30 feet long. Moreover, the preferred enclosed drying room is 10 feet high, 15 feet wide and 50 feet long, thereby containing both conveyors 34 and 45. Of course, both conveyors may be disposed in a stacked orientation or in line with one another. However, preferably they will be in line with one another and eight 36 inches fans, operating at 1700 RPMs, will be utilized in order to dry the produce. Ultimately, the produce will preferably remain in the drying room for approximately 1 minute and 30 seconds, and the pulp temperature of the produce will range from 50 to 70 degrees depending upon the outside temperature. This fifty to seventy degrees, however, is substantially lower than the pulp temperature achieved utilizing previously available drying procedures.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. A method of cleaning and preparing a quantity of produce for sale, the method comprising the steps of:

spraying the quantity of produce with a mixture of water and ozone so as to cover the quantity of produce and so as to loosen dirt and mold, and kill bacteria;

brushing the quantity of produce;

spraying the quantity of produce with a further mixture of water and ozone so as to clean, rinse and disinfect the quantity of produce;

applying food grade wax to the quantity of produce; and drying the quantity of produce.

2. A method of cleaning and preparing a quantity of produce as recited in claim 1 further including initial steps of:

placing the quantity of produce on a conveyor, and rotating the quantity of produce, while the quantity of produce is being sprayed with said mixture of water and ozone, so as to expose all sides thereof.

3. A method of cleaning and preparing a quantity of produce as recited in claim 1 wherein said step of spraying the quantity of produce with said mixture of water and ozone further include spraying the quantity of produce at a rate of about 0.5 gallons per minute per spray head.

4. A method of cleaning and preparing a quantity of produce as recited in claim 3 wherein said step of spraying the quantity of produce at said rate of about 0.5 gallons per minute per spray head further includes spraying the quantity of produce through about six spray heads.

5. A method of cleaning and preparing a quantity of produce as recited in claim 1 wherein said step of brushing the quantity of produce, further includes placing the quantity of produce on a rotating brush bed.

6. A method of cleaning and preparing a quantity of produce as recited in claim 1 wherein said steps of brushing the quantity of produce, and spraying the quantity of produce with said further mixture of water and ozone are performed simultaneously.

7. A method of cleaning and preparing a quantity of produce as recited in claim 6 wherein said step of spraying the quantity of produce with said further mixture of water and ozone also includes spraying the quantity of produce at a rate of about 1 gallon per minute per spray head.

8. A method of cleaning and preparing a quantity of produce as recited in claim 7 wherein said step of spraying the quantity of produce at said rate of about 1 gallon per minute per spray head further includes spraying the quantity of produce through eight spray heads.

9. A method of cleaning and preparing a quantity of produce as recited in claim 1 wherein said step of removing excess water from the quantity of produce further includes blowing air over the quantity of produce at ambient temperature.

10. A method of cleaning and preparing a quantity of produce as recited in claim 1 wherein said step of drying the quantity of produce comprises:

placing the quantity of produce on a first drying conveyor, drying the quantity of produce on said first drying conveyer, transferring the quantity of produce onto a second drying conveyor so as to expose an opposite side of the quantity of produce, and drying the quantity of produce on said second drying conveyer.

11. A method of cleaning and preparing a quantity of produce as recited in claim 10 wherein said step of drying the quantity of produce on said first drying conveyor includes passing the quantity of produce through a first, enclosed, drying room containing at least one fan and a dehumidifier.

12. A method of cleaning and preparing a quantity of produce as recited in claim 11 wherein said step of passing the quantity of produce through said first, enclosed, drying room containing said at least one fan and said dehumidifier further includes passing the quantity of produce through said first, enclosed, drying room containing an 1100 CFM desiccant dehumidifier operating at about 17–24 degrees relative humidity.

13. A method of cleaning and preparing a quantity of produce as recited in claim 11 wherein said step of drying the quantity of produce on said second drying conveyor includes rotating the quantity of produce through said first, enclosed, drying room.

14. A method of cleaning and preparing a quantity of produce as recited in claim 11 wherein said step of drying the quantity of produce on said first drying conveyor includes passing the quantity of produce through said first, enclosed, drying room for about 1.5 minutes.

15. A method of cleaning and preparing a quantity of produce as recited in claim 11 wherein said step of drying the quantity of produce on said second drying conveyor includes passing the quantity of produce through a second, enclosed, drying room containing at least one fan and a dehumidifier.

16. A method of cleaning and preparing a quantity of produce as recited in claim 15 wherein said step of passing the quantity of produce through said second, enclosed, drying room containing said at least one fan and said dehumidifier further includes passing the quantity of produce through said second, enclosed, drying room containing an 1100 CFM desiccant dehumidifier operating at about 17–24 degrees relative humidity.

17. A method of cleaning and preparing a quantity of produce as recited in claim 15 wherein said step of drying the quantity of produce on said second drying conveyor includes passing the quantity of produce through said second, enclosed, drying room for about 1.5 minutes.

18. A method of cleaning and preparing a quantity of produce as recited in claim 1 wherein said step of applying food grade wax to the quantity of produce further includes spraying the food grade wax onto the quantity of produce.

19. A method of cleaning and preparing a quantity of produce as recited in claim 1 wherein said step of applying food grade wax to the quantity of produce further includes dripping the food grade wax onto the quantity of produce.

20. A method of cleaning and preparing a quantity of produce for sale, the method comprising the steps of:

placing the quantity of produce on a conveyor;

rotating the quantity of produce so as to expose all sides thereof;

spraying the quantity of produce with a mixture of water and ozone so as to cover the quantity of produce and so as to loosen dirt and mold, and kill bacteria;

placing the quantity of produce on a rotating brush bed;

brushing the quantity of produce;

spraying the quantity of produce with a further mixture of water and ozone so as to clean, rinse and disinfect the quantity of produce;

removing excess of water from the quantity of produce;

applying food grade wax to the quantity of produce;

placing the quantity of produce on a first drying conveyor;

drying the quantity of produce;

rotating the quantity of produce onto a second drying conveyor; and drying the quantity of produce.

* * * * *